(12) United States Patent
Oohara et al.

(10) Patent No.: US 6,243,630 B1
(45) Date of Patent: Jun. 5, 2001

(54) VEHICLE CONTROL SYSTEM

(75) Inventors: Kouichi Oohara, Okazaki; Katsumi Takaba, Obu; Kazuhiko Nakai, Chiryu; Hirokazu Oguro, Okazaki; Yuko Yamamoto, Kariya, all of (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/020,421

(22) Filed: Feb. 9, 1998

(30) Foreign Application Priority Data

Mar. 17, 1997 (JP) .................................... 9-063372
Mar. 17, 1997 (JP) .................................... 9-063373

(51) Int. Cl.$^7$ .................................................. G06F 19/00
(52) U.S. Cl. ................................................ 701/35; 701/114
(58) Field of Search ............................ 701/29, 35, 114

(56) References Cited

U.S. PATENT DOCUMENTS

| | | | |
|---|---|---|---|
| 5,497,330 | * | 3/1996 | Ishida ........................................ 701/35 |
| 5,594,646 | * | 1/1997 | Itoh et al. ................................ 701/35 |
| 5,801,621 | * | 9/1998 | Issa et al. ................................ 701/35 |
| 5,857,159 | * | 1/1999 | Dickrell et al. ......................... 701/35 |
| 5,916,268 | * | 6/1999 | Seashore et al. ....................... 701/29 |

FOREIGN PATENT DOCUMENTS

| | | |
|---|---|---|
| 62-132256 | 8/1987 | (JP) . |
| 5-79379 | 3/1993 | (JP) . |
| 6-249673 | 9/1994 | (JP) . |
| 8-153397 | 6/1996 | (JP) . |
| 9-68096 | 3/1997 | (JP) . |

\* cited by examiner

*Primary Examiner*—William A. Cuchlinski, Jr.
(74) *Attorney, Agent, or Firm*—Nixon & Vanderhye P.C.

(57) ABSTRACT

A vehicle control system reduces the number of times learned value data is written into an electrically rewritable non-volatile ROM (EEPROM),. Learned value data (attained through learning control operation of a vehicle) is saved into the EEPROM, and then on battery disconnection, it can be transferred from the EEPROM back to an ordinary RAM instead of being lost. Each time engine rotating speed NE reaches a predetermined value (e.g., 500 rpm) after the ignition switch is turned on, a counter is incremented. When the counter reaches a predetermined count (e.g., the learned value data as of that time is written into the EEPROM for safe keeping and the counter is reset. Consequently, learned value data is written into the EEPROM in a manner which requires the vehicle to actually run a number of times, thereby making it possible to safely reduce the number of times the learned value data is written into the EEPROM for safe keeping.

13 Claims, 2 Drawing Sheets

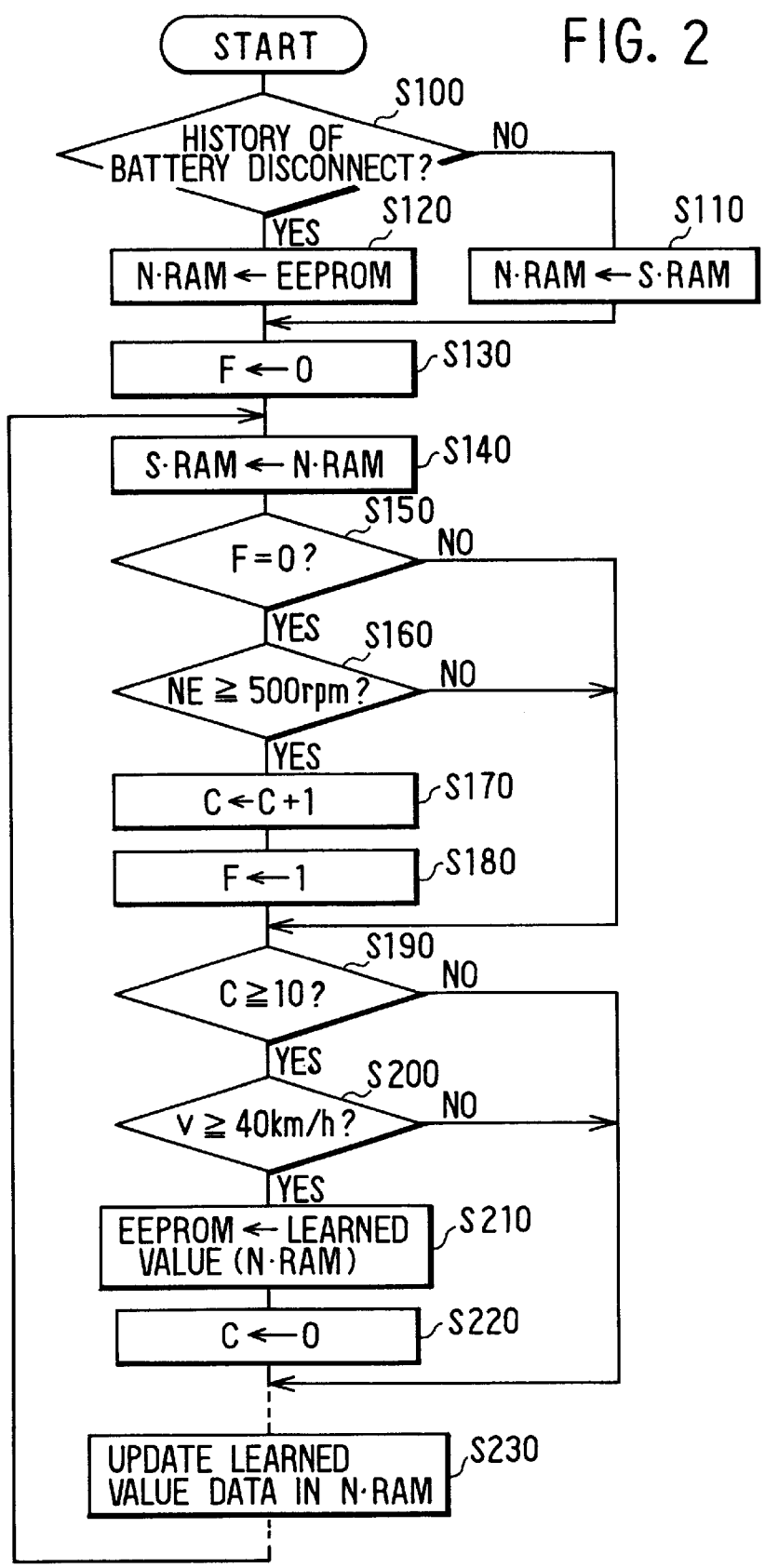

VEHICLE CONTROL SYSTEM

CROSS-REFERENCE TO RELATED APPLICATION

This application is related to Japanese Patent Application Nos. Hei 9-63372 and Hei 9-63373, incorporated herein by reference.

BACKGROUND OF THE INVENTION

1. Field of the Invention

The present invention relates to vehicle control systems, and more particularly to a vehicle control system in which learned value data is stored into an electrically rewritable nonvolatile ROM such as an EEPROM.

2. Description of Related Art

Conventionally, in a vehicle control system for controlling a vehicle engine or automatic transmission, a learning control method is in widespread use for correcting control parameters and logic data through evaluation of past control results to eliminate an adverse effect due to deterioration with age or individual difference of a controlled object. Learned value data including control parameters attained by means of learning control is held in a standby RAM (backup RAM which is always supplied with battery power).

However, if a battery is disconnected from a vehicle intentionally or accidentally, learned value data held in the standby RAM will be lost. Therefore, in recent years, learned value data has been stored into an electrically rewritable nonvolatile ROM such as an EEPROM. On occurrence of a battery disconnection, the learned value data is transferred from the nonvolatile ROM to an ordinary RAM. In this manner, previously attained learned value data is used continuously.

In the abovementioned arrangement, by increasing a frequency of updating learned value data in the electrically rewritable nonvolatile ROM(EEPROM), the latest possible learned value data can be used for control operation in the event of a battery disconnection. Under the present-day technological constraints, however, this kind of nonvolatile ROM has a guaranteed upper limit of rewritable count, which is specified by each semiconductor device manufacturer. If it is attempted to rewrite data thereinto beyond the guaranteed upper limit of rewritable count, the data may not be stored accurately therein. Therefore, it is not desirable to frequently update learned value data in the electrically rewritable nonvolatile ROM.

In Japanese Unexamined Patent Publication No. 79379/1993, for example, there is disclosed a vehicle control system arranged for writing the latest learned value data into an EEPROM at intervals of a certain period of time. In consideration of a useful lifetime of an automobile (up to 15–20 years), the possibility of exceeding a specific guaranteed upper limit of rewritable count of the EEPROM is very high. Furthermore, in this kind of vehicle control system in which operating power is supplied when an engine ignition switch of a vehicle is turned on, the vehicle is not always run while the vehicle control system is activated by turning on the ignition switch. Consequently, useless learned value data may be written into the EEPROM at the time of updating, thereby causing a count of writing data into the EEPROM to increase more than necessary.

SUMMARY OF THE INVENTION

It is therefore an object of the present invention to obviate the abovementioned disadvantage by providing a vehicle control system in which a count of writing learned value data into an electrically rewritable nonvolatile ROM can be kept below a specific guaranteed upper limit of rewritable count thereof without sacrificing performance of learning control.

In carrying out the present invention and according to one aspect thereof, there is provided a vehicle control system equipped with an electrically rewritable nonvolatile ROM and arranged so that learned value data attained through learning control of vehicle operation is written into said nonvolatile ROM under a predetermined condition and retained therein. More specifically, after an ignition switch of a vehicle is turned on, drive detecting means checks whether the vehicle is actually run, counting means calculates the number of detections made by the drive detecting means in case of actual drive of the vehicle, and then drive count checking means determines whether a count value indicated by the counting means reaches a predetermined value.

In said vehicle control system, if the drive count checking means determines that the count value indicated by the counting means reaches the predetermined value, the learned value data retained in said nonvolatile ROM is updated and also the count value in the counting means is reset.

In the vehicle control system arranged as mentioned above according to the present invention, when the ignition switch is turned on and the vehicle is run actually, a count value in the counting means is incremented by one. Then, when the count value indicated by the counting means reaches a predetermined value, the contents of said nonvolatile ROM are updated and also the count value in the counting means is reset. In this fashion, after the vehicle is run actually the predetermined number of times, the latest learned value data is written into said nonvolatile ROM.

Therefore, in the vehicle control system according to the present invention, when the vehicle is not actually run, even if the ignition switch is turned on, the contents of said nonvolatile ROM are not updated and thus the learned value data useful for actual drive control of the vehicle is retained therein. Still more, since the latest learned value data is written into said nonvolatile ROM only after the vehicle is run actually the predetermined number of times, it is possible to substantially reduce a count of writing data into said nonvolatile ROM.

Thus, a count of writing learned value data into said nonvolatile ROM can be kept below a specific guaranteed upper limit of rewritable count thereof without sacrificing performance of learning control.

Still more, the drive detecting means may be configured so that it recognizes actual drive of the vehicle when an engine rotating speed of the vehicle reaches a predetermined level of rotating speed. This configuration makes it possible to detect an actual drive of the vehicle positively with ease.

On the other hand, in a conventional type of vehicle control system in which operating power is supplied when an ignition switch of a vehicle is turned on as aforementioned, if a driver of the vehicle turns off the ignition switch while a processing operation of writing learned value data into a nonvolatile ROM is in progress, the write processing operation is interrupted to damage the learned value data therein.

To solve this problem, according to the present invention, there is provided an arrangement which further comprises travel state detecting means for checking whether or not a vehicle is run at a vehicle travel speed higher than or equal to a predetermined travel speed level. When the drive count checking means determines that a count value indicated by the counting means reaches a predetermined value and also said travel state detecting means recognizes that the vehicle is run at a vehicle travel speed higher than or equal to the predetermined travel speed level, learned value data is written into the nonvolatile ROM and a count value in the counting means is reset.

More specifically, unless the vehicle is run at a vehicle travel speed higher than or equal to the predetermined travel speed level even when the drive count checking means determines that a count value indicated by the counting means reaches the predetermined value, the learned value data is not written into the nonvolatile ROM. It is written into the nonvolatile ROM under condition that the vehicle is run at a vehicle travel speed higher than or equal to the predetermined travel speed level and also a count value indicated by the counting means reaches the predetermined value.

In such an arrangement as mentioned above, the learned value data is written into the nonvolatile ROM only in a situation where there is no possibility that the vehicle driver does not turn off the ignition switch, thereby making it possible to positively prevent the learned value data from being damaged.

The above and other objects, features and advantages of the present invention will become more apparent from the following description of embodiments with reference to the accompanying drawings.

BRIEF DESCRIPTION OF THE DRAWINGS

FIG. 2 is a flowchart which shows processing steps to be carried out by the CPU indicated in FIG. 1.

DETAILED DESCRIPTION OF THE PREFERRED EMBODIMENTS

Figure 1:
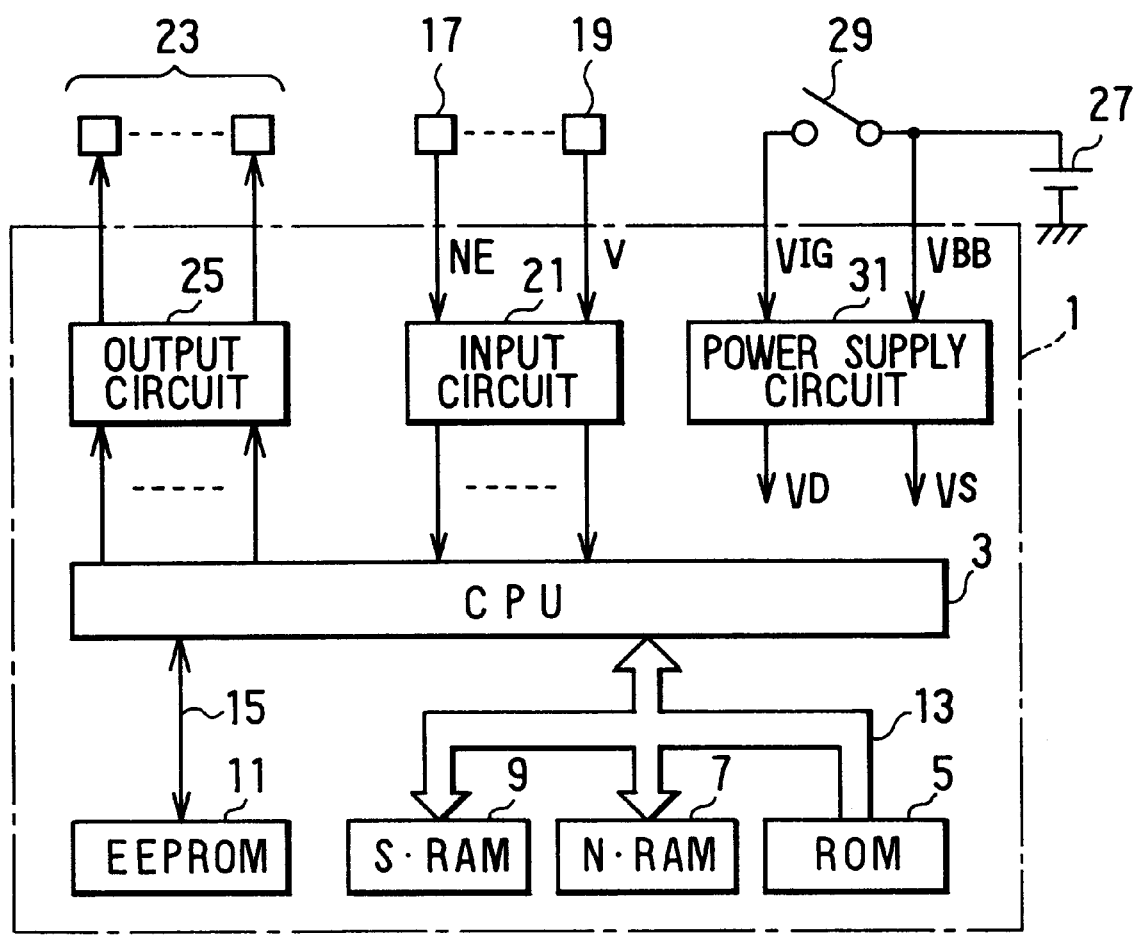
FIG. 1 is a circuit block diagram showing a configuration of a vehicle engine control unit (ECU) in a preferred embodiment of the present invention.

The present invention will now be described in further detail by way of example with reference to the accompanying drawings. It is to be understood that the present invention is not limited to the following preferred embodiments and that various changes and modifications may be made in the invention without departing from the spirit and scope thereof.

Referring now to FIG. 1, there is shown a configuration of a vehicle engine control unit (hereinafter referred to as ECU 1) in a preferred embodiment of the present invention.

As shown in FIG. 1, the ECU 1 in the present preferred embodiment comprises a CPU 3 which carries out various processing operations for controlling an engine mounted on a vehicle, a ROM 5 which stores programs to be carried out by the CPU 3, an ordinary RAM which temporarily stores results of control operations by the CPU 3 for execution (hereinafter referred to as N·RAM 7, which is not backed up by battery power), a standby RAM which is backed up by battery power (hereinafter referred to as S·RAM 9), and an EEPROM 11 which is an electrically rewritable nonvolatile ROM.

The CPU 3, ROM 5, N·RAM 7 and S·RAM 9 are mutually connected through a bus 13, and also the CPU 3 and the EEPROM 11 are connected through a serial data line 15.

Still more, the ECU 1 includes an input circuit 21, an output circuit 25 and a power supply circuit 31: The input circuit 21 is used to receive signals from various sensors such as a rotating speed sensor 17 for detecting an engine rotating speed 'NE', a vehicle speed sensor 19 for detecting a vehicle travel speed 'V', etc., and input these signals to the CPU 3. The output circuit 25 is used to operate actuators 23 such as an injector, ignitor, etc. in response to a drive signal output from the CPU 3. The power supply circuit 31 is used to receive an ignition voltage VIG from a battery 27 mounted on the vehicle through an ignition switch 29 and output an operating voltage VD to the CPU 3, ROM 5, N·RAM 7, S·RAM 9 and EEPROM 11, and it is also used to receive a battery voltage VBB directly from the battery 27 without connection through the ignition switch 29 and output a backup voltage VS to the S·RAM 9 for retaining data therein.

In the ECU 1 mentioned above, when the ignition switch 29 is turned on, the operating voltage VD is fed from the power supply circuit 31 to the CPU 3, ROM 5, N·RAM 7, etc. Then, the CPU 3 carries out engine control processing according to programs stored in the ROM 5 and operates the actuators 23 in response to signals received from various sensors.

The engine control processing carried out by the CPU 3 is based on the principle of learning control. In the sequence of learning control, the CPU 3 periodically attains learned value data such as control parameters calculated in the N·RAM 7 and a value of a counter C (incremented in the N·RAM 7 as described later), and it periodically copies them to the S·RAM 9 so that the learned value data and the value of the counter C will not be lost even if the ignition switch 29 is turned off. Furthermore, the CPU 3 transfers the learned value data in the N·RAM 7 to the EEPROM 11 when certain conditions are satisfied as described later. Thus, even if the data stored in the S·RAM 9 disappears due to a disconnection of the battery 27, the same data remains in the EEPROM 11.

The following describes processing to be carried out by the CPU 3 in the ECU 1, with particular reference to FIG. 2 which shows a flowchart thereof. In execution of the processing shown in FIG. 2, operations and determinations for the counter C and flag F (described later) are performed using the N·RAM 7.

As shown in FIG. 2, when the ignition switch 29 is turned on, the CPU 3 starts its operation and performs initialization at steps S100 to S130 (herein after 'S' denotes a step).

More specifically, at S100, it is determined whether there is a history of battery disconnection (whether the battery 27 has been disconnected or not). This determination is performed by checking data stored in the S·RAM 9, for instance. If the data stored in the S·RAM 9 is normal, it is determined that there is no history of battery disconnection. On the contrary, if the stored data is not normal, it is determined that there is a history of battery disconnection.

In case that there is no history of battery disconnection, S110 is performed. At S110, the data stored in the S·RAM 9 (i.e., learned value data backed up in the S·RAM 9 when the ignition switch 29 is turned off, including a value of the counter C) is written into the N·RAM 7. In case that there is a history of battery disconnection, S120 is performed since the data stored in the S·RAM 9 is undefined. At S120, the learned value data held in the EEPROM 11 is written into the N·RAM 7.

After execution of either S110 or S120, S130 is then performed. At S130, '0' indicating that the vehicle is not yet run is set in the flag F, which is used to indicate whether the vehicle is run actually after the ignition switch 29 is turned on.

Upon completion of initialization at S100 to S130 as mentioned above, the CPU 3 proceeds to execution of the engine control processing based on learning control. In parallel to execution thereof, the CPU 3 repeats processing operations of S140 to S230 cyclically.

First, at S140, the learned value data and counter-C value currently stored in the N·RAM 7 are written (copied) into the S·RAM 9.

Then, at S150, it is checked whether the flag F indicates '0' or not. If '0' is indicated, the CPU 3 goes to S160, at which it is checked whether or not an engine rotating speed 'NE' detected using a signal received from the rotating speed sensor 17 is higher than or equal to a predetermined rotating speed (500 rpm in the vicinity of an idling rotational speed level in the present preferred embodiment).

If the engine rotating speed is higher than or equal to 500 rpm, it is recognized that the vehicle is run actually after the ignition switch 29 is turned on. In this case, the CPU 3 goes to S170. At S170, the counter-C value in the N·RAM 7 is incremented, and then at S180, the flag F is set to '1' to indicate that the vehicle is run actually.

In a situation where the flag F is set to '1' at S180, it is determined at S150 that '10' is not indicated in the flag F, or it is determined at S160 that the engine rotating speed 'NE' is lower than 500 rpm. At S190, it is determined whether or not the counter-C value is larger than or equal to a predetermined value (10 in the present preferred embodiment).

If the counter-C value is larger than or equal to 10, S200 is performed. At S200, it is determined whether or not a vehicle speed 'v' detected using a signal received from the vehicle speed sensor 19 is higher than or equal to a predetermined vehicle speed (40 km/h in the present preferred embodiment).

If the vehicle speed 'v' is higher than or equal to 40 km/h, the CPU 3 goes to S210. At S210, the learned value data currently stored in the N·RAM 7 is written into the EEPROM 11 for updating, and then at S220, the counter-C value is cleared to '0'. Then, the CPU 3 carries out other subsequent processing.

The learned value data held in the N·RAM 7 is updated at 230 when it is determined at S190 that the counter-C value is less than 10, or that, at S200, the vehicle speed 'v' is lower than 40 km/h. Thereafter, the CPU 3 goes back to S140, where the latest learned value data and the counter-C value currently stored in the N·RAM 7 are written into the S·RAM 9. Then, the S150 and the subsequent processing steps mentioned above are carried out repeatedly.

In the ECU 1 in the present preferred embodiment, until the engine rotating speed 'NE' reaches 500 rpm after the engine is started by turning on the ignition switch 29, negative determination is made at S160 continuously. When the engine rotating speed 'NE' becomes higher than or equal to 500 rpm, it is determined that the vehicle is actually run, and the counter-C value is incremented by one at S170.

After the counter-C value is incremented by one, the flag F is set to '1' at S180. Thereafter, as long as the ignition switch 29 remains on, negative determination is made at S150 so that the counter-C value is not incremented further. When the ignition switch 29 is turned on in the next operation of the vehicle, the counter-C value held in the S·RAM 9 at S140 is written into the N·RAM 7 at step S110.

Therefore, the counter-C value is incremented by one under condition that the engine rotating speed 'NE' reaches 500 rpm after the ignition switch 29 is turned on.

If the counter-C value reaches 10 and also the vehicle speed 'v' reaches 40 km/h, positive determination is made at S190 and S200. Then, at S210, the learned value data stored in the N·RAM 7 is written into the EEPROM 11 for updating, and at S220, the counter-C value is cleared to '0'.

Therefore, in the ECU 1 in the present preferred embodiment, the learned value data is written into the EEPROM 11 for updating on every tenth occurrence of a condition that the engine rotating speed 'NE' reaches 500 rpm after the ignition switch 29 is turned on, i.e., the EEPROM 11 is updated in a cycle that the vehicle is run actually ten times.

Thus, in the ECU 1 in the present preferred embodiment, if the vehicle is not actually run after the ignition switch 29 is turned on, the contents of the EEPROM 11 are not updated and the learned value data useful for actual drive control of the vehicle is retained herein. Still more, since the learned value data is written into the EEPROM 11 in a cycle that the vehicle is run actually ten times, a count of writing data in the EEPROM 11 can be reduced significantly.

Consequently, in the ECU 1, a count of writing the learned value data into the EEPROM 11 during a useful life of the vehicle can be kept below a specific guaranteed upper limit of rewritable count thereof without sacrificing performance of learning control.

Still more, for determining whether the vehicle is run actually, it is checked whether the engine rotating speed 'NE' reaches a predetermined rotating speed. Therefore, an actual drive of the vehicle can be detected positively with ease.

At the time of a battery disconnection, the EEPROM 11 may hold the past learned value data, which is nine cycles old in the worst case, thereby making it impossible to reflect the latest learned value data to control. However, in an ordinary situation, the battery 27 is not disconnected immediately after purchase of a new vehicle. Also, even if the past learned value data is several cycles old, it does not deviate extremely from an optimum value level owing to learning control, provided that learning control has been carried out several times. Therefore, even in such a case, performance of learning control is scarcely affected.

Furthermore, in the ECU 1 in the present preferred embodiment, even if the counter-C value reaches 10, the learned value data is not written into the EEPROM 11 unless the vehicle speed 'v' is higher than or equal to 40 km/h. When the vehicle speed 'v' reaches 40 km/h, the learned value data is written into the EEPROM 11. Thus, the contents of the EEPROM 11 can be updated reliably.

More specifically, if the vehicle driver turns off the ignition switch 29 while a processing operation of writing the learned value data into the EEPROM 11 is in progress, the write processing operation is interrupted to damage the learned value data therein. Then, if a battery disconnection occurs immediately after interruption of the write processing, the past learned value data becomes unavailable. However, there is no possibility that the ignition switch 29 is turned off under condition that the vehicle speed 'v' is higher than or equal to 40 km/h. Thus, the learned value data is written into the EEPROM 11 reliably, thereby preventing occurrence of a problem that the learned value data is damaged.

In accordance with the present preferred embodiment, the processing steps S130, S150, S160 and S180 correspond to the drive detecting means, the processing step S170 to the counting means, the processing step S190 to the drive count checking means, and the processing step S200 to the travel state detecting means.

In carrying out this invention, a preset rotating speed to be checked at S160 in FIG. 2 is not limited to 500 rpm and may be specified at an arbitrary level. It is however preferred to specify the preset rotating speed in the vicinity of an engine idling rotational speed level as in the present preferred embodiment.

As to a counter preset level to be checked at S190 in FIG. 2, it is not limited to 10 in practicing this invention. The preset counter level may be specified properly according to a total number of actual drive operations expected during the useful life of the vehicle and a specific guaranteed upper limit of rewritable count of the EEPROM 11. That is, it is advisable to specify the counter preset level so that a count of writing the learned value data into the EEPROM 11 will not exceed the guaranteed upper limit of rewritable count of the EEPROM 11.

It is also possible to specify an arbitrary preset vehicle speed (40 km/h) to be checked at S200 in FIG. 2.

Still more, a flash ROM may be adopted as a data rewritable nonvolatile ROM instead of the EEPROM employed in the present preferred embodiment.

Moreover, as exemplified at S210 in FIG. 2, the counter-C value may be written into the EEPROM 11 together with the learned value data. In this fashion, if a history of battery disconnection is recognized, the counter-C value calculated up to a time point of occurrence of battery disconnection may be used since the counter-C value held in the EEPROM 11 is transferred to the N·RAM 7 in FIG. 2.

Furthermore, although having described the ECU 1 in the present preferred embodiment for vehicle engine control, it is to be understood that any other vehicle control system such as an electronic automatic transmission control system may be embodied according to this invention.

The invention may be embodied in other specific forms without departing from the spirit or essential characteristics thereof. The present embodiment is therefore to be considered in all respects as illustrative and not restrictive, the scope of the invention being indicated by the appended claims rather by the foregoing description and all changes which come within the meaning and range of equivalency of the claims are therefore intended to be embraced therein.

What is claimed is:

1. A method of controlling operation of a motor vehicle, comprising the steps of:
    (a) collecting vehicle operational data if the vehicle has entered a run mode;
    (b) temporarily storing the vehicle operational data along with vehicle operational data collected during previous run modes; and
    (c) permanently storing temporarily stored vehicle operational data after a predetermined number of run modes if motor vehicle speed is above a predetermined motor vehicle speed threshold.

2. The method of claim 1, further comprising the steps of:
    repeating steps (a)–(c); and
    replacing earlier permanently stored vehicle operational data with new operational data after a subsequent predetermined number of run modes.

3. The method of claim 1, further comprising the step of:
    monitoring a battery of the motor vehicle to determine a battery disconnect status thereof; and
    providing system control parameters corresponding to the battery disconnect status.

4. The method of claim 1, wherein said vehicle operational data is learned data that is learned during the run mode.

5. The method of claim 1, wherein said predetermined threshold is larger than 0 km/h.

6. A vehicle control system equipped with an electrically rewritable nonvolatile ROM and arranged so that learned value data attained through learning control operation of a vehicle is written into said novolatile ROM under a predetermined condition and retained therein, said system comprising:
    a drive detector that checks whether said vehicle is actually running after an ignition switch thereof is turned on,
    a counter that calculates a number of detections made by said drive detector in case of actual drive of said vehicle,
    a drive count checker for determining whether a count value indicated by said counter reaches a predetermined value,
    wherein, if said drive count checker determines that a count value indicated by said counter is said predetermined value or more, said learned value data is written into said nonvolatile ROM and said count value indicated by said counter is initialized; and
    a travel state detector for checking whether or not said vehicle is running at a vehicle travel speed higher than or equal to a predetermined travel speed level,
    wherein, if said drive count checker determines that a count value indicated by said counter is said predetermined value or more and also said travel state detector determines that said vehicle is running at a vehicle travel speed higher than or equal to said predetermined travel speed level, said learned value data is written into said nonvolatile ROM and said count value indicated by said counter is initialized.

7. A vehicle control system according to claim 6, wherein said drive detector recognizes actual drive of said vehicle when an engine rotating speed of said vehicle is a predetermined rotating speed level or more.

8. A vehicle control system according to claim 6, further comprising an ordinary RAM not backed up by battery power and a standby RAM backed up by battery power,
    wherein, a history of battery disconnection is checked when said ignition switch is turned on, said learned value data stored in said nonvolatile ROM is written into said ordinary RAM when said history of battery disconnection is found, said learned value data stored in said standby RAM is written into said ordinary RAM when said history of battery disconnection is not found, said learned value data stored in said ordinary RAM is updated by means of learning control operation.

9. A vehicle control system according to claim 8, wherein said learned value data stored in said ordinary RAM is written into said standby RAM cyclically when said ignition switch is turned on.

10. A vehicle control system arranged so that operating power is supplied for control of a vehicle when an ignition switch of said vehicle is turned on and learned value data attained through learning control operation of said vehicle is written into an electrically rewritable nonvolatile ROM and retained therein, comprising:
    a travel state detector that checks whether or not said vehicle is running at a vehicle travel speed higher than or equal to a predetermined travel speed level,
    wherein said learned value data is written into said nonvolatile ROM when said travel state detector determines that said vehicle is running at a vehicle travel speed higher than or equal to said predetermined travel speed.

11. A vehicle control system according to claim 10, wherein said nonvolatile ROM is arranged so that data is written thereinto through a serial data line.

12. A vehicle control system according to claim 10, further comprising a counter that increments upon a vehicle engine operating at or above a predetermined engine rotating speed, said learned value data being written into said nonvolatile ROM when said counter increments to a predetermined count.

13. A vehicle control system according to claim 10, further comprising a battery disconnect monitor that monitors battery disconnect status of a vehicle battery and that provides system control parameters corresponding to the status thereof.